April 23, 1957  J. F. CAMP  2,789,663
AIR FILTERING UNIT

Filed Oct. 5, 1955

*INVENTOR.*
JOHN F. CAMP
BY

United States Patent Office 2,789,663
Patented Apr. 23, 1957

2,789,663

AIR FILTERING UNIT

John F. Camp, Memphis, Tenn.

Application October 5, 1955, Serial No. 538,633

12 Claims. (Cl. 183—49)

This invention relates to air filters, more particularly, replaceable air filters for use in air conditioning units and the like.

Filters of this type are used in air ducts, such as the air passageways of air conditioners where there is a flow of air which is to be filtered as it passes from one location to another. Such filters rapidly collect dust and other matter from the atmosphere and must be periodically replaced or cleaned, or the air flow will be greatly reduced, which will decrease the efficiency of the air filtering operation.

In the common type now employed the filter unit comprises a filter element encased between perforated metal sheets, the element being permanently mounted in the casing. This type cannot be readily cleaned, and at best can only be cleaned with a vacuum cleaner or the like. Consequently, in most cases when the units become clogged with dirt the entire unit is disposed of and a new one substituted in its place. This obviously is an undesirable and costly practice. To overcome this practice various attempts have been made to construct filter units having replaceable filter elements. Heretofore the casings of such units have been of cumbersome construction and have not been adapted for efficient cleaning.

It is contemplated in the present invention that an improved air filter unit be provided in which the filter element is quickly and easily replaced.

It is further contemplated that such a unit be provided in which the casing is formed of a material which possesses the properties of resiliency, flexibility and water imperviousness. Thus when the filter unit becomes clogged with dirt the unit is removed from the air duct and the sides folded back to remove the filter element. The casing may then be cleaned by washing and the filter unit either cleaned as by vacuuming or the like or may be disposed of and a new element substituted in its place.

The principal object of the present invention is to provide an air filter which is simple in construction and which comprises a casing having a filter element encased therein which may be quickly and easily removed for the cleaning or replacement thereof.

A further object is to provide a filter unit which is easily insertable in and removable from the apparatus in which it is used.

A further object is to provide a filter casing formed from a water impervious, resilient and flexible material which may readily be washed.

A further object is to provide such a filter casing comprising a pair of flexible oppositely disposed wings having a rigid backbone connected to the lower edges thereof, said wings being bendable for insertion and removal of a filter element.

A further object is to generally improve the design and construction of air filter units.

The means by which the foregoing and other objects of the present invention are accomplished and the manner of their accomplishment will be readily understood from the following specification upon reference to the accompanying drawing, in which.

Figure 1:
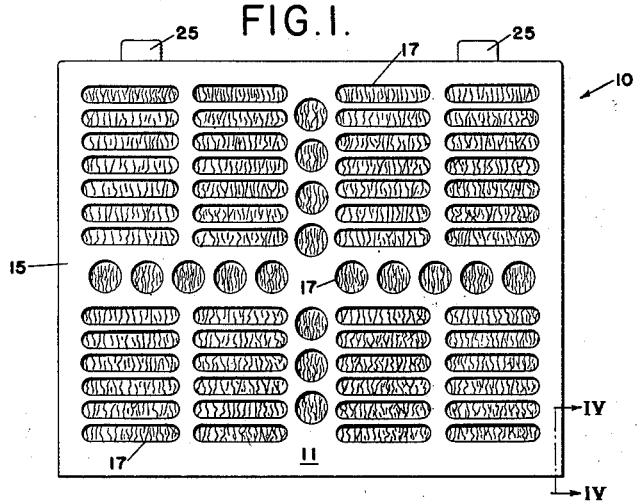
Fig. 1 is a side elevational view of the air filter unit.

Referring now to the drawings in which the various parts are indicated by numerals, the filter unit 10 of the present invention comprises in general a casing 11 in which is removably mounted a filter element 13.

Casing 11 preferably comprises a pair of oppositely disposed flat upstanding self-supporting wings 15 preferably formed of a plastic having flexible, resilient and water impervious characteristics, as for example polyethylene or the like. Wings 15 may be of any shape, but in the preferred embodiment illustrated the wings are substantially rectangular. Each of wings 15 is cut out to provide a plurality of air flow apertures 17 which may be in any desired shape, one design being illustrated in Fig. 1. Wings 15 preferably match, that is, the rectangular dimensions of the wings are preferably the same and the apertures in one of the wings are preferably in register with the apertures in the other of the wings, whereby a passage for air is provided.

A rigid backbone 19 is secured to wings 15 adjacent the lower edges thereof to form the open ended and open topped casing 11 which has sides defined by the wings and a bottom defined by the backbone. Backbone 19 may be secured to wings 15 as by gluing. Backbone 19 is preferably formed of a plastic having rigid and water impervious characteristics, and extends from end to end of casing 11.

Figure 2:
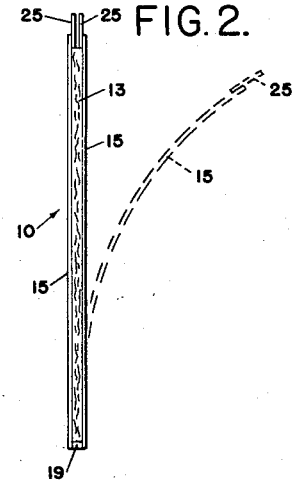
Fig. 2 is an end elevational view of the filter unit, illustrating in dotted lines one of the wings folded back.

In the normal or non-flexed position wings 15 are substantially parallel to each other and substantially perpendicular to backbone 19 as illustrated in solid lines in Fig. 2. When the wings 15 are flexed, as for example to the position of the wing illustrated in dotted lines in Fig. 2, and then released, the resiliency of the wings will cause return to the non-flexed position. It will be understood that the resilient and flexible characteristic of the wings provides a casing which facilitates the replacement of filter element 13 and provides a casing which efficiently houses the filter element. Thus the relatively limber filter element is held in upstanding position by the support of wings 15, urging inwardly on the element.

Filter element 13 is preferably formed of any suitable filtering material, which may be spun glass or other efficient filtering material. However, it has been found most advantageous and economical to form the element from air pervious paper or cellulose products which are readily disposable and of a low cost in production. The casing 11 of the present invention is particularly efficient in enabling the use of filtering elements of a material such as paper or cellulose since the resiliency of the casing wings urging the wings into erect substantially flat condition effects supporting face engagement throughout the depth of the filter element so that the limberness or non-rigidity of a paper or cellulose material is readily overcome and the element maintained in properly extended filtering position. The filter element is preferably of a size and shape corresponding to the size and shape of casing 11, that is, the filter element is preferably rectangular and of a size to fill the casing from end to end and top to bottom, whereby filter element 13 will be interposed between all of the indexed apertures 17 in wings 15. Also, filter element 13 is preferably of a thickness substantially equal to the thickness of backbone 19 whereby the filter element will substantially fill the space between wings 15 when the wings are in parallel relationship.

Figure 3:
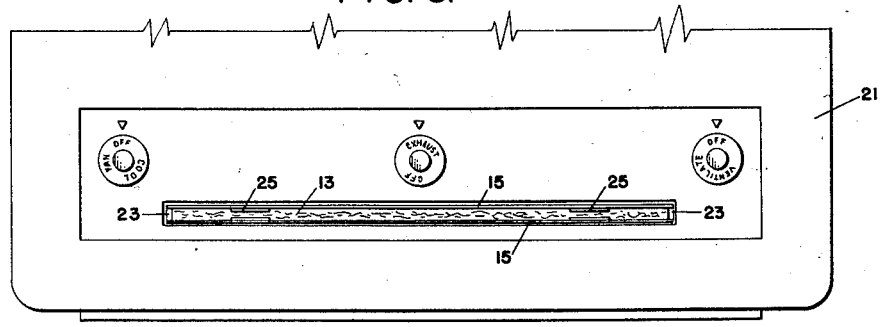
Fig. 3 is a fragmentary top plan view of an air conditioning unit illustrating the filter unit inserted therein.
Figure 4:
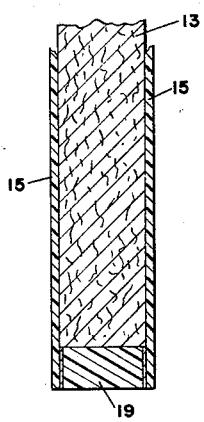
Fig. 4 is a fragmentary sectional view taken as on the line IV—IV of Fig. 1.

Filter unit 10 is adapted to be used in conjunction with a machine for filtering air, as for example the filter unit is useful as a filtering medium in an air conditioning unit. Thus in Fig. 3 filter unit 10 is illustrated in use with a conventional air conditioning unit 21. In the application illustrated filter unit 10 is vertically placed in a vertical slot 23 in air conditioning unit 21. Unit 10 slidably and loosely fits in slot 23 and rests on a pan or other supporting surface, not shown, at the bottom of the slot. The filter unit is thus disposed so that the air enters from the outside atmosphere and passes through filter unit 10 and then into the room being air conditioned.

For ease of handling casing 11 may be provided with tabs 25 formed integral with or attached as by gluing adjacent the upper edges of wings 15. Tabs 25 are preferably, though not necessarily, formed of the same material as wings 15 and are disposed in pairs, as illustrated, with the tabs of said pairs respectively attached to opposite wings 15 in alinement with one another, whereby the pairs of tabs may be brought in face to face relationship and used as handles during the removal and insertion of filter unit 10.

When it becomes necessary to clean filter unit 10, the unit is withdrawn from air conditioning unit 21, the wings 15 are unfolded and filter element 13 removed. Casing 11, which is water impervious, may then be washed to thoroughly remove the accumulation of dirt and foreign matter therefrom. The removed filter element may then be either cleaned or replaced by a new element, whichever is desired.

To reassemble the filter unit, the wings 15 are bent back and the new, or the clean, filter element is simply placed in position between wings 15 with the lower edge of the filter element resting on backbone 19, and then the resilient wings are allowed to return to their normal parallel position which will hold the filter elements substantially straight. The filter unit thus reassembled is replaced in slot 23 as previously described. It will be understood that in replacing the filter unit, due to the smoothness of the casing 11 formed from plastic or the like, the casing will not have a tendency to be snagged by any object. In the common type of filter unit using perforated metal sides, when replacing the casing, the metal very frequently will be snagged and will retain its bent shape. This is in contrast to the present invention in which the wings of the casing are not susceptible of such snagging, but if this should happen the wings will return to their normal shape due to the resiliency of the material.

As is known, moisture will condense in air conditioning units and it will be understood that in the present invention the filter element will be shielded from this moisture by the water impervious casing. Also, backbone 19 is of sufficient height so that the filter element resting thereon will be spaced from the pan or supporting surface at a sufficient distance to keep the element out of any water which might have collected on said pan or supporting surface.

I claim:

1. In an air filter, a pair of matching and oppositely disposed substantially flat plastic wings, a rigid backbone interposed between said wings and secured to said wings adjacent the lower edges thereof to form an open ended and open top casing having sides defined by said wings and a bottom defined by said backbone, a filter element removably mounted in said casing, said wings being cut-out to form apertures for the passage of air through said wings and said filter element, said wings being flexible and resilient whereby said wings are flexed for removal and replacement of the filter element, the resiliency of said wings when flexed urging return of said wings to flat condition.

2. In an air filter, a pair of oppositely disposed substantially flat wings, a rigid backbone interposed between said wings and secured to said wings adjacent the lower edges thereof to form an open ended and open top casing having sides defined by said wings and a bottom defined by said backbone, a filter element removably mounted in said casing, said wings being cut-out to form apertures for the passage of air through said wings and said filter, said wings being flexible and resilient whereby said wings are flexed for removal and replacement of the filter element, the resiliency of said wings when flexed urging return of said wings to flat condition.

3. In an air filter, a pair of oppositely disposed substantially flat wings, a rigid backbone interposed between said wings and secured to said wings adjacent the lower edges thereof to form an open ended and open top casing having sides defined by said wings and a bottom defined by said backbone, said wings being cut-out to form apertures for the passage of air therethrough, said wings being flexible and resilient whereby said wings are flexed for removal and replacement of a filter element, and tabs respectively attached adjacent the upper edges of said wings, said tabs providing handles for lifting said casing.

4. In an air filter, a pair of oppositely disposed substantially flat wings, a rigid backbone interposed between said wings and secured to said wings adjacent the lower edges thereof to form an open ended and open top casing having sides defined by said wings and a bottom defined by said backbone, said wings being cut-out to form apertures for the passage of air therethrough, said wings being flexible and resilient whereby said wings are flexed for removal and replacement of a filter element, the resiliency of said wings when flexed urging return of said wings to flat condition.

5. In an air filter, a pair of matching and substantially parallel flat plastic wings, a rigid backbone interposed between said wings and secured to said wings adjacent the lower edges thereof to form an open ended and open top casing having sides defined by said wings and a bottom defined by said backbone, upstanding tabs respectively attached adjacent the upper edges of said wings, said tabs being grouped in pairs, the tabs of each of said pairs being attached to opposite said wings in corresponding disposition whereby said pairs may be brought into face-to-face engagement for use as handles in lifting said casing, a filter element removably mounted in said casing, said wings being cut-out to form indexed apertures for the passage of air through said wings and said filter, said wings being flexible and resilient whereby said wings are flexed for removal and replacement of the filter element, said wings being water impervious to shield the filter element from water accumulations.

6. In an air filter, a pair of matching and substantially parallel flat plastic wings, a rigid backbone interposed between said wings and secured to said wings adjacent the lower edges thereof to form an open ended and open top casing having sides defined by said wings and a bottom defined by said backbone, upstanding tabs respectively attached adjacent the upper edges of said wings, said tabs being grouped in pairs, the tabs of each of said pairs being attached to opposite said wings in corresponding disposition whereby said pairs may be brought into face-to-face engagement for use as handles in lifting said casing, a filter element removably mounted in said casing, said wings being cut-out to form indexed apertures for the passage of air through said wings and said filter, said wings being flexible and resilient whereby said wings are flexed for removal and replacement of the filter element.

7. In an air filter, a pair of substantially parallel flat wings, a backbone interposed between said wings and secured to said wings adjacent the lower edges thereof to form an open ended and open top casing having sides defined by said wings and a bottom defined by said backbone, upstanding tabs respectively attached adjacent the upper edges of said wings, said tabs being grouped in pairs, the tabs of each of said pairs being attached to opposite said wings in corresponding disposition whereby said pairs may be brought into face-to-face engagement for use as handles in lifting said casing, a filter element removably mounted in said casing, said wings benig cut-out to form apertures for the passage of air through said wings and said filter, said wings being flexible and resilient whereby said wings are flexed for removal and replacement of the filter element.

8. In an air filter adapted for use in an air flow passage as of an air conditioning unit, a casing comprising a rigid backbone, a pair of flat upstanding self-supporting wings respectively secured adjacent their lower edges along opposite sides of and substantially perpendicular to said backbone, said wings being resilient for yielding to flexing from flat condition for access between said wings, the resiliency of said wings urging return to flat condition from flexed condition, and a flat filter element embraced between said wings in face to face surface engagement when said wings are in said flat condition, said engagement supporting said element in extended flat condition.

9. In an air filter adapted for use in an air flow passage as of an air conditioning unit, a casing comprising a rigid backbone, a pair of flat upstanding self-supporting wings respectively secured adjacent their lower edges along opposite sides of and substantially perpendicular to said backbone, said wings being resilient for yielding to flexing from flat condition for access between said wings, the resiliency of said wings urging return to flat condition from flexed condition, and a limber flat filter element embraced between said wings in face to face surface engagement when said wings are in said flat condition, said engagement supporting said element in extended flat condition.

10. In an air filter, a pair of oppositely disposed, substantially flat wings, means interposed between said wings and secured to said wings adjacent the lower edges thereof to form an open ended and open top casing having sides defined by said wings and a bottom defined by said means, said wings being cut out to form apertures for the passage of air therethrough, said wings being flexible and resilient whereby said wings are flexed for removal and replacement of a filter element.

11. In an air filter adapted for use in an air flow passage, a casing comprising a pair of flat upstanding self-supporting and spaced wings, means joining said wings along their lower edges, said wings being resilient for yielding to flexing from flat condition for access between said wings, the resiliency of said wings urging return to flat condition from flexed condition, and a flat filter element embraced between said wings in face to face surface engagement when said wings are in said flat condition, said engagement supporting said element in extended flat condition.

12. In an air filter adapted for use in an air flow passage, a casing comprising a pair of flat upstanding self-supporting and spaced wings, means joining said wings adjacent their lower edges, said wings being resilient for yielding to flexing from flat condition for access between said wings, the resiliency of said wings urging return to flat condition from flexed condition, and a limber flat filter element embraced between said wings in face to face surface engagement when said wings are in said flat condition, said engagement supporting said element in extended flat condition.

References Cited in the file of this patent

UNITED STATES PATENTS

| | | |
|---|---|---|
| 1,916,907 | Sargent | July 4, 1933 |
| 2,057,568 | Gerard | Oct. 13, 1936 |